Nov. 3, 1964   R. W. BATT   3,155,352
MOUNTING SYSTEM FOR ACCESSORY CASE
Filed March 31, 1961   2 Sheets-Sheet 1

INVENTOR
RICHARD W. BATT
BY Charles A. Warren
ATTORNEY

Nov. 3, 1964       R. W. BATT       3,155,352
MOUNTING SYSTEM FOR ACCESSORY CASE
Filed March 31, 1961       2 Sheets-Sheet 2

INVENTOR
RICHARD W. BATT
BY Charles A. Warren
ATTORNEY

United States Patent Office 3,155,352
Patented Nov. 3, 1964

3,155,352
MOUNTING SYSTEM FOR ACCESSORY CASE
Richard W. Batt, Wethersfield, Conn., assignor to United Aircraft Corporation, East Hartford, Conn., a corporation of Delaware
Filed Mar. 31, 1961, Ser. No. 99,738
3 Claims. (Cl. 248—17)

This invention relates to mounting systems for mounting accessories or accessory equipment on structures subject to excessive temperature variations and particularly to mounting an accessory drive gearbox on the outer casing or housing of the engine of a powerplant.

This invention is especially adapted for use in providing a support for an accessory drive gearbox on a turbine engine at the point where the outer casing increases in diameter adjacent the downstream end of the compressor. The engine casing is subject to extremely high temperatures under operating conditions and therefore the changes in dimension, due to thermal growth of the engine casing, are much greater than those that occur in the gearbox. One feature of the invention is a mounting for the gearbox to minimize stresses in either gearbox or engine casing and to maintain adequate alignment of the gearing in the gearbox with that in the engine casing.

In accordance with the invention, the supporting arrangement comprises a four-point support including three transversely aligned and circumferentially spaced apart front supports and a rear support in substantially axial alignment with the center support of the three front supports and axially spaced therefrom. The central front support is designed to carry side loads only and the two side front supports to carry only vertical loads. The rear support is designed to carry side and vertical loads as well as thrust loads.

Other features and advantages will be apparent from the specification and claims, and from the accompanying drawings which illustrate an embodiment of the invention.

Figure 1:
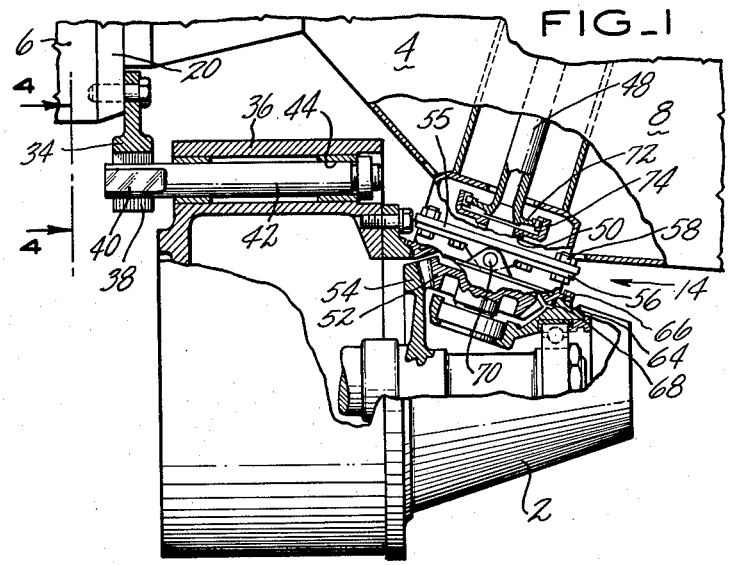
FIG. 1 is a fragmentary side elevation of an accessory gearbox mounted on an engine casing, parts being broken away along the line 1—1 of FIG. 5 to show certain supports for the gearbox.
Figure 2:
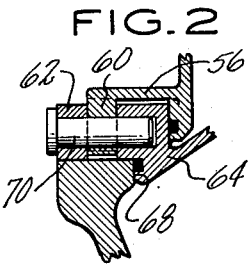
FIG. 2 is a fragmentary sectional view through one side of the rear mounting shown in FIG. 1.
Figure 4:
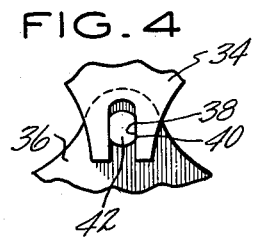
FIG. 4 is a fragmentary view substantially as seen along the line 4—4 of FIG. 1.
Figure 3:
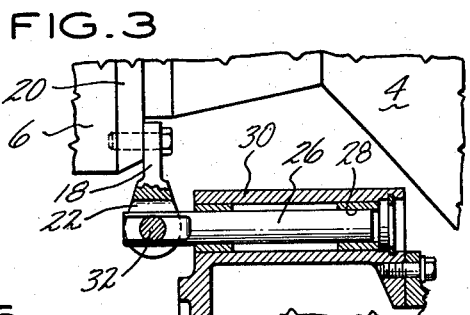
FIG. 3 is a fragmentary sectional view substantially along line 3—3 of FIG. 5 to show one of the side front supports of the gearbox.

The invention is illustrated as a suspension system for an accessory drive gearbox 2 which is suspended from the outside of an engine casing or housing 4 of a gas turbine powerplant. The portion of the powerplant shown includes a compressor casing 6 and a combustor section 8 with the accessory box 2 mounted at the point where the housing 4 is reduced in diameter between the compressor and the combustor section. The engine casing and the accessory casing have parallel longitudinal axes defining a longitudinal plane which in the arrangement shown would be substantially at the line 1—1.

Figure 5:
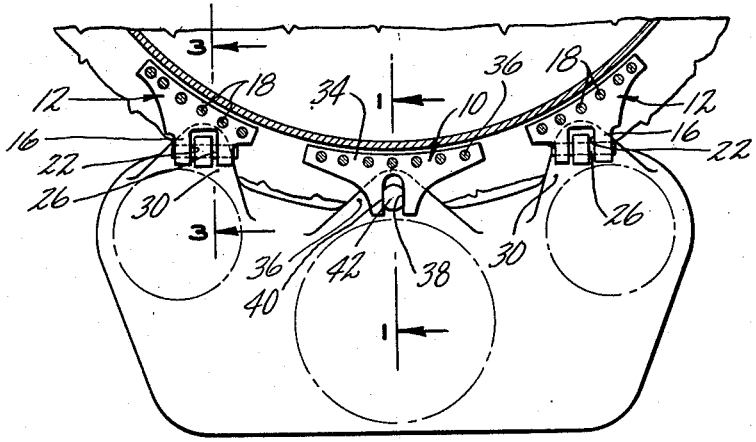
FIG. 5 is a fragmentary front elevation of the gearbox with the casing in section and showing the three front gearbox supports.

The suspension system includes a front suspension system shown in transverse view in FIG. 5 and includes a front center support 10 and two side supports 12. The three supports are substantially in transverse alignment and are spaced circumferentially of the compressor casing, as clearly shown in FIG. 5. The suspension system also includes a rear support 14 shown in FIG. 1. This support is spaced axially from the front support system and is in substantially axial alignment with the front center support 10.

Each front side support 12 includes a bracket 16 attached as by bolts 18 to an engine flange 20. The bracket 16 has a vertical slot 22 therein to receive the flattened end portion 24 of a pin 26. The pin 26 is positioned to slide axially in a bore 28 provided in a boss 30 on the gearbox. A horizontal hinge pin 32 holds the support pin 26 within the bracket 18 to support any vertical loads, that is to say, loads parallel to the plane of the longitudinal axes in a transverse plane at right angles to the longitudinal axes. The head of the support pin 26 has lateral freedom in the vertical slot 22, as clearly shown in FIG. 5, since the slot is wider than the head thereby permitting relative lateral movement of the pin within the slot during thermal growth of the structure. The axial sliding motion of the pin in the bore 28 permits axial growth thermally between gearbox and housing.

The front center support 10 has a supporting bracket 34 attached as by bolts 36 to the engine flange 20. The bracket 34 has a vertical slot 38 therein to receive the flattened end 40 of a support pin 42. The pin 42 is positioned in a bore 44 provided in a boss 36 on the gearbox 2. The opposite flattened sides 46 of the pin are free to slide vertically within the slot 38 so that the front center support prevents lateral movement of the gearbox but permits a vertical movement of the gearbox at this point during thermal growth of the gearbox and housing.

Since the rear support to be described prevents axial movement of the gearbox, there is axial clearance provided between the bracket 18 and the associated part of the gearbox and also between the bracket 34 and the adjacent parts of the gearbox to permit thermal growth in an axial direction with respect to the engine housing.

By this arrangement, the front center support holds the box against lateral movement while permitting vertical thermal expansion and the front side supports carry the vertical loading of the gearbox and permit relative lateral movement at this point while maintaining the desired vertical position of the gearbox with respect to the engine housing.

The rear support 14 is arranged to have the accessory drive shaft 48 extending downwardly therethrough. This shaft is driven from the main engine shaft through beveled gears in the usual way and the shaft 48 is connected through a secondary shaft 50 to the bevel gear 52 which is located within the gearbox and drives, for example, a main accessory drive gear 54.

The rear support bracket includes a flanged plate 55 supported on the engine housing 4 and having attached thereto an attachment plate 56 as by bolts 58. The plate carries spaced aligned sleeves 60, the axis of which intersect the shaft 50. Each sleeve 60 is adapted to fit between supporting sleeves 62 carried by a bracket 64 in the form of a ring attached as by bolts 66, FIG. 1, to an opening 68 in the gearbox. Each sleeve 60 and its associated sleeves 62 receive a pin 70 which permits a small amount of pivotal motion between plate 56 and bracket 64. It is obvious that to minimize the distortion it is desirable to have the pins 70 in axial alignment with one another transversely of the gearbox and also in aligned position to intersect the axis of the drive shaft.

The shaft 48 may have a splined enlargement 72 at its lower end in mesh with a cooperating splined cup 74 on the shaft 50 to permit the above-described small amount of pivotal movement of the gearbox.

Figure 6:
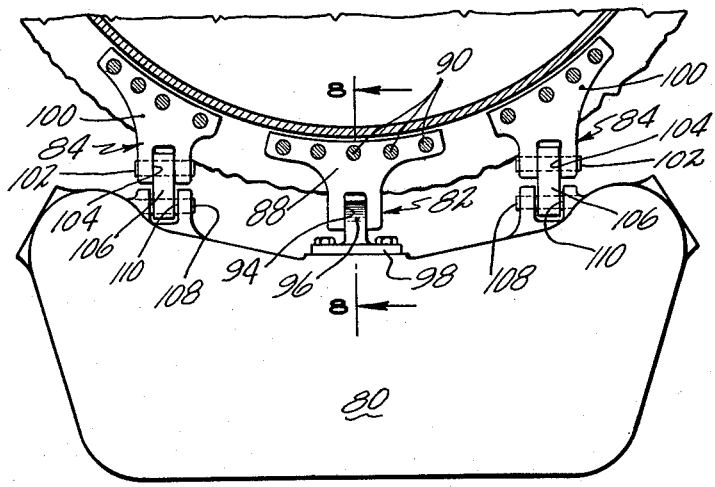
FIG. 6 is a fragmentary front elevation similar to FIG. 5 showing a modification of the drive gearbox front support system parts being broken away along line 6—6 of FIG. 7.
Figure 7:
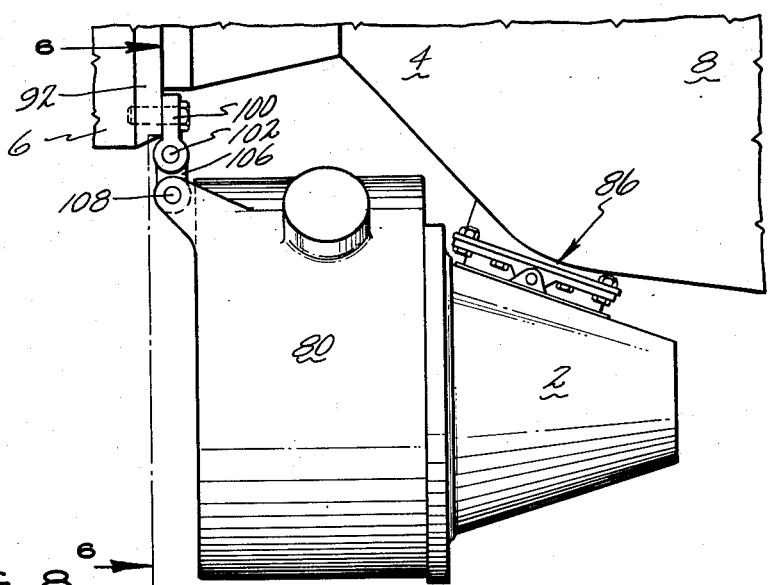
FIG. 7 is a fragmentary side elevation of the gearbox and mounting shown in FIG. 6.
Figure 8:
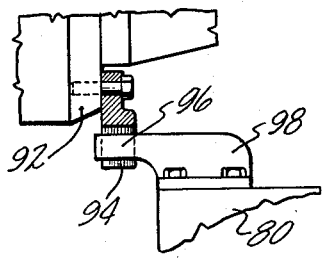
FIG. 8 is a fragmentary sectional view substantially along the line 8—8 of FIG. 6.

In the arrangement of FIGS. 6, 7 and 8, the gearbox 80 is supported by a central front support 82 and laterally spaced side supports 84 in substantially transverse alignment with the center front support 82. The rear support 86 is similar to the rear support above-described. The center front support 82 includes a bracket 88 attached as by bolts 90 to the attachment ring 92 forming a part of the casing. The support 82 has a vertical slot 94 therein to receive the forwardly projecting stub 96 on a bracket 98 attached centrally adjacent the forward end of the gearbox 80. The stub 96 is guided within the vertical slot 94 but with no substantial freedom of lateral movement so that vertical movement can occur at this point although no transverse movement occurs.

Each side front support 84 includes a bracket 100 attached to the mounting ring 92 and having a horizontal bore therein to receive a pin 102. A slot 104 through which the pin 102 passes receives the upper end of a connecting link 106, the bottom end of which is carried by a pin 108 in the gearbox 80. The bottom end of the link 106 is received in a slot 110 and there is clearance provided between the link and the walls of the slot 110 so that horizontal movement can occur between the bracket 100 and the gearbox at this point although the links carry the gearbox and thus prevent any vertical movement at this point.

The arrangement functions in the manner similar to the arrangement described in connection with FIGS. 1 to 4, inclusive, in that thermal growth between the engine casing and the gearbox will not impart any stresses to either the engine housing or the gearbox although the supporting structure will hold the gearbox effectively in parallel axial relation to the engine housing.

It is to be understood that the invention is not limited to the specific embodiment herein illustrated and described, but may be used in other ways without departure from its spirit as defined by the following claims.

I claim:

1. The combination of a housing, an accessory case and a mounting for supporting the accessory case from the housing, the latter having a flange, said casing and housing having generally-parallel, spaced, longitudinal axes defining a plane, said mounting including a hinge connection between housing and case at a point axially spaced from the flange on the housing, the hinge having its axis substantially normal to said plane for pivotal movement of the case, and a plurality of transversely spaced connections between the flange and the case and axially spaced from the hinge, one of said connections including a first pair of interengaging elements having relative sliding movement both in an axial direction and in a transverse direction at right angles to the axes, the others of the transversely spaced connections each including a second pair of interconnected elements having relative movement both in an axial direction and in a direction at right angles to said plane such that the transverse movement of the first pair is at right angles to the movement of each of the second pairs, these relative movements permitting relative thermal expansion between the housing and case in all directions while maintaining the spaced longitudinal axes parallel.

2. The combination as in claim 1 in which said one of said connections includes a projection on the accessory case and a slotted bracket on the housing, the slot extending transversely of the housing in a plane at right angles to said axes and the projection being slidable in the slot both axially of the housing and transversely of the housing.

3. The combination as in claim 1 in which each of said others of said connections includes a rod axially slidable in the case, and a bracket mounted on said flange and having a pin engaging said rod extending transversely of the housing at right angles to said plane, said rod being slidable on said pin for movement of the case relative to the housing at this point in a direction at right angles to said plane.

References Cited in the file of this patent

UNITED STATES PATENTS

| | | |
|---|---|---|
| 1,254,708 | Leonard | Jan. 29, 1918 |
| 1,416,760 | Steenstrup | May 23, 1922 |
| 2,481,547 | Walker | Sept. 13, 1949 |
| 3,042,349 | Pirtle | July 3, 1962 |